United States Patent
Nishio

(10) Patent No.: US 9,215,733 B2
(45) Date of Patent: Dec. 15, 2015

(54) COMMUNICATION TERMINAL DEVICE, BASE STATION DEVICE AND RADIO COMMUNICATION METHOD

(71) Applicant: PANASONIC CORPORATION, Osaka (JP)

(72) Inventor: Akihiko Nishio, Osaka (JP)

(73) Assignee: GODO KAISHA IP BRIDGE 1, Chiyoda-Ku, Tokyo (JP)

(*) Notice: Subject to any disclaimer, the term of this patent is extended or adjusted under 35 U.S.C. 154(b) by 0 days.

(21) Appl. No.: 14/066,316

(22) Filed: Oct. 29, 2013

(65) Prior Publication Data
US 2014/0056285 A1 Feb. 27, 2014

Related U.S. Application Data

(63) Continuation of application No. 11/628,505, filed as application No. PCT/JP2005/010373 on Jun. 6, 2005, now Pat. No. 8,571,567.

(30) Foreign Application Priority Data

Jun. 10, 2004 (JP) .................................. 2004-173017

(51) Int. Cl.
*H04B 7/216* (2006.01)
*H04W 74/08* (2009.01)
(Continued)

(52) U.S. Cl.
CPC .......... *H04W 74/085* (2013.01); *H04W 52/281* (2013.01); *H04W 74/0841* (2013.01); *H04W 52/246* (2013.01); *H04W 52/262* (2013.01); *H04W 52/50* (2013.01)

(58) Field of Classification Search
CPC ............ H04W 52/246; H04W 52/262; H04W 52/281; H04W 52/50; H04W 74/0841
USPC .................... 455/450; 370/342, 345, 347, 335
See application file for complete search history.

(56) References Cited

U.S. PATENT DOCUMENTS

| 5,203,008 A | 4/1993 | Yasuda |
| 5,448,751 A | 9/1995 | Takenaka |

(Continued)

FOREIGN PATENT DOCUMENTS

| CN | 1474525 | 2/2004 |
| JP | 5-292010 | 11/1993 |

(Continued)

OTHER PUBLICATIONS

European Search Report dated Feb. 17, 2011.
(Continued)

*Primary Examiner* — David Q Nguyen
(74) *Attorney, Agent, or Firm* — Dickinson Wright PLLC

(57) ABSTRACT

A communication terminal eliminates collision of access request signals simultaneously transmitted from communication terminals in a local cell, prevents generation of interference signals in another cell adjacent to the local cell, and improves local cell throughput. A base station controls transmission power of the access permission signal so as to prevent generation of an interference signal in another cell adjacent to the local cell. A use sub-channel selection unit has a correspondence table between the reception quality of the pilot signals divided into classes and the sub-channel allocated to the classes. According to the table, the use sub-channel selection unit selects a sub-channel group of RACH correlated to the measurement result of the reception quality of the pilot signals reported from the reception quality measurement unit. One sub-channel to be used for transmission of the access request signal is selected at random from the sub-channel group selected.

6 Claims, 14 Drawing Sheets

(51) Int. Cl.
  *H04W 52/28* (2009.01)
  *H04W 52/24* (2009.01)
  *H04W 52/26* (2009.01)
  *H04W 52/50* (2009.01)

(56) References Cited

U.S. PATENT DOCUMENTS

| | | | |
|---|---|---|---|
| 5,581,547 | A | 12/1996 | Umeda |
| 5,758,090 | A | 5/1998 | Doner |
| 6,052,594 | A | 4/2000 | Chuang |
| 6,738,646 | B2 | 5/2004 | Miyoshi |
| 2001/0036113 | A1 | 11/2001 | Jurgensen |
| 2001/0038619 | A1 | 11/2001 | Baker |
| 2002/0123349 | A1 | 9/2002 | Miyoshi |
| 2003/0036361 | A1 | 2/2003 | Kawai |
| 2003/0095528 | A1 | 5/2003 | Halton |
| 2004/0082357 | A1 | 4/2004 | Moulsley |
| 2004/0204101 | A1 | 10/2004 | Qiu |
| 2007/0091815 | A1 | 4/2007 | Tinnakornsrisuphap |
| 2008/0049694 | A1 | 2/2008 | Kinoshita |
| 2008/0070610 | A1 | 3/2008 | Nishio |

FOREIGN PATENT DOCUMENTS

| | | |
|---|---|---|
| JP | 7-336757 | 12/1995 |
| JP | 2688686 | 8/1997 |
| JP | 10-117373 | 5/1998 |
| JP | 2001-352573 | 12/2001 |
| JP | 2002-528997 | 9/2002 |
| JP | 2003-87192 | 3/2003 |
| JP | 2003-298510 | 10/2003 |
| JP | 2004-320165 | 11/2004 |
| RU | 2 382 524 | 2/2010 |
| RU | 2 384 008 | 3/2010 |
| WO | 00/25443 | 5/2000 |
| WO | 2004/030392 | 4/2004 |
| WO | 2004/038951 | 5/2004 |
| WO | 2005/115034 | 12/2005 |

OTHER PUBLICATIONS

Japanese Office Action dated Mar. 8, 2011.
Japanese Interrogation dated Dec. 20, 2011.
Mexican Office Action dated Aug. 18, 2010.
PCT International Search Report dated Oct. 4, 2005.

| RECEPTION QUALITY OF PILOT SIGNAL | GROUP OF COMMUNICATION TERMINAL APPARATUS 200 |
|---|---|
| 15dB OR MORE | 1 |
| 5~15dB | 2 |
| -3~5dB | 3 |

FIG.9

| GROUP OF COMMUNICATION TERMINAL APPARATUS 200 | TRANSMISSION POWER OF ACCESS PERMISSION SIGNAL |
|---|---|
| 1 | -15dB |
| 2 | -5dB |
| 3 | 3dB |

FIG.10

| GROUP OF COMMUNICATION TERMINAL APPARATUS 200 | MODULATION SCHEME AND CODING RATE |
|---|---|
| 1 | 16QAM, R=3/4 |
| 2 | QPSK, R=1/2 |
| 3 | QPSK, R=1/3 |

FIG.15

COMMUNICATION TERMINAL DEVICE, BASE STATION DEVICE AND RADIO COMMUNICATION METHOD

CROSS REFERENCE TO RELATED APPLICATIONS

This is a continuation application of U.S. application Ser. No. 11/628,505 filed Dec. 5, 2006, which is a 371 application of PCT/JP2005/010373 filed Jun. 6, 2005, which is based on Japanese Application No. 2004-173017 filed Jun. 10, 2004, the entire contents of each of which are incorporated by reference herein.

TECHNICAL FIELD

The present invention relates to a radio communication system, and a communication terminal apparatus and base station apparatus constituting the system.

BACKGROUND ART

Conventionally, in a radio communication system, when a communication terminal apparatus such as a cellular telephone or the like starts radio communication, the communication terminal apparatus receives a pilot signal periodically transmitted from a base station apparatus, and transmits an access request signal subjected open-loop transmission power control (OL-TPC) based on reception quality of the pilot signal to the base station apparatus using a random access channel (RACH). Then, when receiving the access request signal, the base station apparatus transmits an access permission signal to the communication terminal apparatus.

FIG. 1 schematically illustrates a configuration of a conventional radio communication system. The radio communication system as shown in FIG. 1 is comprised of base station apparatus 11 and a plurality of communication terminal apparatuses 12. Further, among the plurality of communication terminal apparatuses 12, communication terminal apparatus 12-1 is assumed to be positioned near base station apparatus 11 and in a good reception state. Meanwhile, communication terminal apparatus 12-2 is assumed to be positioned near a boundary of a communication area by base station apparatus 11, namely near a cell edge.

FIG. 2 illustrates radio signals on the time series transmitted and received between communication terminal apparatus 12 and base station apparatus 11 when communication terminal apparatus 12 starts radio communication. As shown in FIG. 2, first, base station apparatus 11 transmits a pilot signal with certain power to a plurality of communication terminal apparatuses 12 using a common pilot channel (CPICH) on downlink.

Next, when receiving the pilot signal, communication terminal apparatus 12 transmits an access request signal with transmission power associated with the reception quality (reception power of the pilot signal on the CPICH in FIG. 2) to base station apparatus 11 using a random access channel (RACH) on uplink. Resources used as a sub-channel of the RACH are predetermined such as, for example, timing, channelization code, subcarrier and the like, and communication terminal apparatus 12 randomly selects one from the predetermined resources in transmitting the access request signal.

Subsequently, when receiving the access request signal, base station apparatus 11 transmits an access permission signal with certain power to communication terminal apparatus 12 using a forward access channel (FACH). Then, when receiving the access permission signal, communication terminal apparatus 12 transmits a data packet with transmission power associated with the reception quality of the pilot signal to base station apparatus 11 using a data channel on uplink. In addition, in FIG. 2, the down arrow represents downlink, while the up arrow represents uplink, in each channel.

Further, as well as the conventional technique as described above, a technique is developed that communication terminal apparatus 12 first transmits a short packet called preamble to base station apparatus 11 while increasing the transmission power gradually, and when base station apparatus 11 detects the preamble, communication terminal apparatus 12 transmits an access request signal to base station apparatus 11 (for example, see Patent Document 1).

Patent Document 1: Japanese Patent Application Laid-Open No. 2002-528997

DISCLOSURE OF INVENTION

Problems to be Solved by the Invention

However, in the conventional technique as shown in FIG. 2, a plurality of communication terminal apparatuses 12 concurrently receives the pilot signal on the CPICH, and randomly selects sub-channels of the RACH to transmit access request signals, so that there is a risk that a plurality of communication terminal apparatuses 12 transmits access request signals on the same sub-channel, and base station apparatus 11 cannot receive the access request signals.

When base station apparatus 11 cannot receive an access request signal from communication terminal apparatus 12, base station apparatus 11 does not transmit an access permission signal to communication terminal apparatus 12. Therefore, communication terminal apparatus 12 determines that the previously transmitted access request signal is not received at base station apparatus 11 after a predetermined time has elapsed since transmission of the access request signal, and transmits the access request signal again to base station apparatus 11 after a lapse of predetermined back-off time. In other words, in such a conventional technique, there is the risk that access request signals transmitted from a plurality of communication terminal apparatuses 12 using the RACH are not received at base station apparatus 11 due to collision, the time is required at communication terminal apparatus 12 to determine whether the previously transmitted access request signal is received at base station apparatus 11, the predetermined back-off time is further set before communication terminal apparatus 12 retransmits the access request signal, and a problem arises that the time increases which is required at communication terminal apparatus 12 to start radio communication, and that throughput degrades in the radio communication system.

Further, in the conventional technique, communication terminal apparatus 12-2 positioned near the cell edge transmits the access request signal with high power over a plurality of times, so that a problem arises that the access request signal becomes an interfering signal in adjacent other cells.

Furthermore, in the conventional technique, when receiving an access request signal, base station apparatus 11 cannot confirm the position of communication terminal apparatus 12 transmitting the access request signal, and base station apparatus 11 transmits an access permission signal with a large amount of power to be transmitted using the FACH without performing transmission power control so that all communication terminal apparatuses 12 located in the cell can receive the access permission signal, and a problem thereby arises that the access permission signal becomes an interfering signal in adjacent other cells in the same way as described above.

In the technique as disclosed in Patent Document 1, communication terminal apparatus 12 transmits the access request signal with required sufficient power obtained by using the preamble to base station apparatus 11, so that the problem is thus improved that the access request signal transmitted from communication terminal apparatus 12-2 located near the cell edge becomes an interfering signal in adjacent other cells. However, any improvements are not obtained in the problem that the throughput deteriorates due to the occurrence of collision of the access request signals, and in the problem that the access permission signal transmitted from base station apparatus 11 becomes an interfering signal in adjacent other cells.

It is therefore an object of the invention to provide a communication terminal apparatus which avoids collision of access request signals even when the access request signals are transmitted concurrently from a plurality of communication terminal apparatuses in a cell of the apparatus, prevents the occurrence of an interfering signal in other cells adjacent to the cell, and improves throughput in the cell, and a base station apparatus which controls transmission power of an access permission signal, and prevents the occurrence of an interfering signal in other cells adjacent to a cell of the base station apparatus.

Means for Solving the Problem

A communication terminal apparatus according to the present invention is a communication terminal apparatus which performs radio communication with a base station apparatus, and adopts a configuration provided with a receiving section that receives a pilot signal transmitted from the base station apparatus, a measuring section that measures reception quality of the received pilot signal, a selecting section that selects a sub-channel to be used in transmitting a signal to the base station apparatus according to a measurement result of the reception quality of the pilot signal, and a transmitting section that transmits the signal to the base station apparatus using the selected sub-channel.

Advantageous Effect of the Invention

According to the invention, even when access request signals are transmitted concurrently from a plurality of communication terminal apparatuses in a cell of the apparatuses, it is possible to avoid collision of the signals, prevent the occurrence of an interfering signal in other cells adjacent to the cell, improve throughput in the cell, and further prevent the occurrence of an interfering signal in other cells adjacent to the cell by controlling transmission power of an access permission signal.

BRIEF DESCRIPTION OF DRAWINGS

FIG. 9 is a diagram illustrating a correspondence between each group of divided communication terminal apparatuses and reception quality of the pilot signal in Embodiment 1 of the present invention;

FIG. 10 is a diagram illustrating a correspondence between each group of divided communication terminal apparatuses and transmission power of an access permission signal in Embodiment 1 of the present invention;

FIG. 15 is a diagram illustrating a correspondence between each group of divided communication terminal apparatuses and a set of a modulation scheme and coding rate in Embodiment 2 of the invention.

BEST MODE FOR CARRYING OUT THE INVENTION

Figure 1:
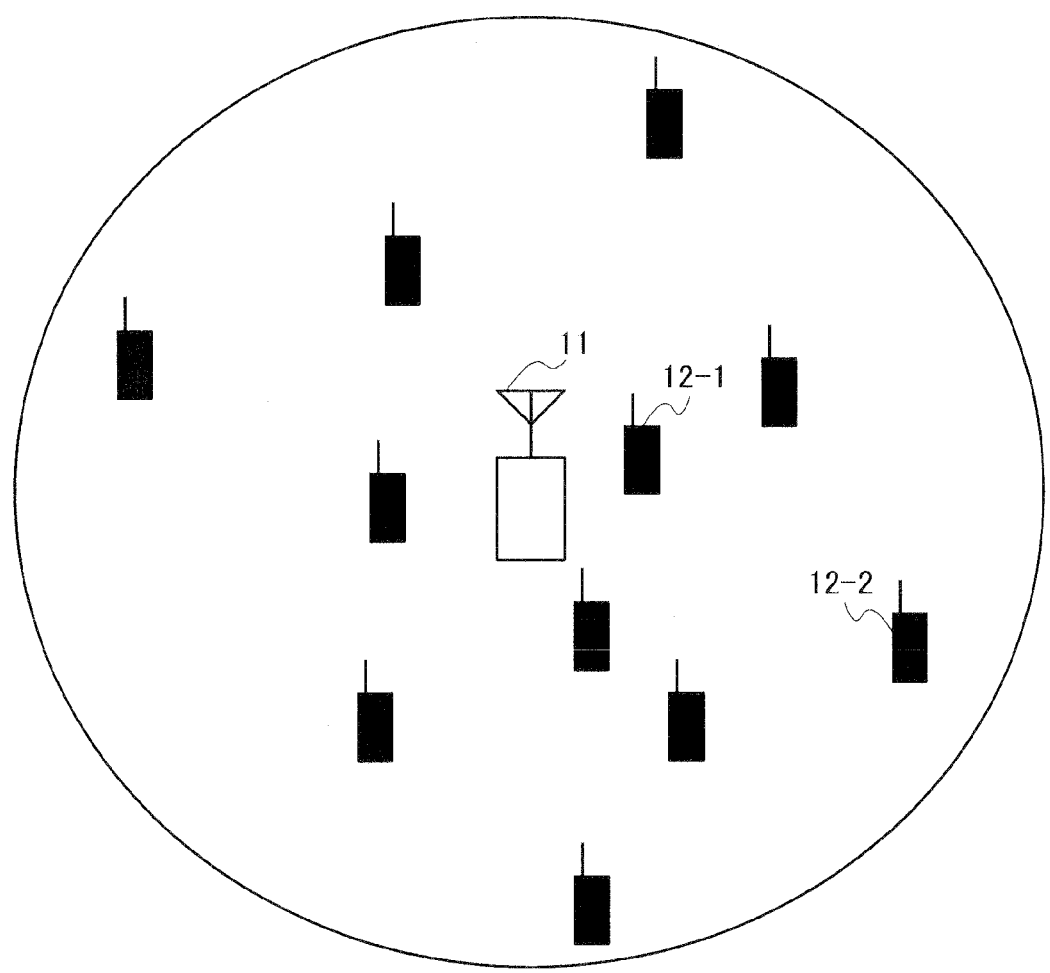
FIG. 1 is a diagram schematically illustrating a configuration of a radio communication system according to conventional technique.
Figure 2:
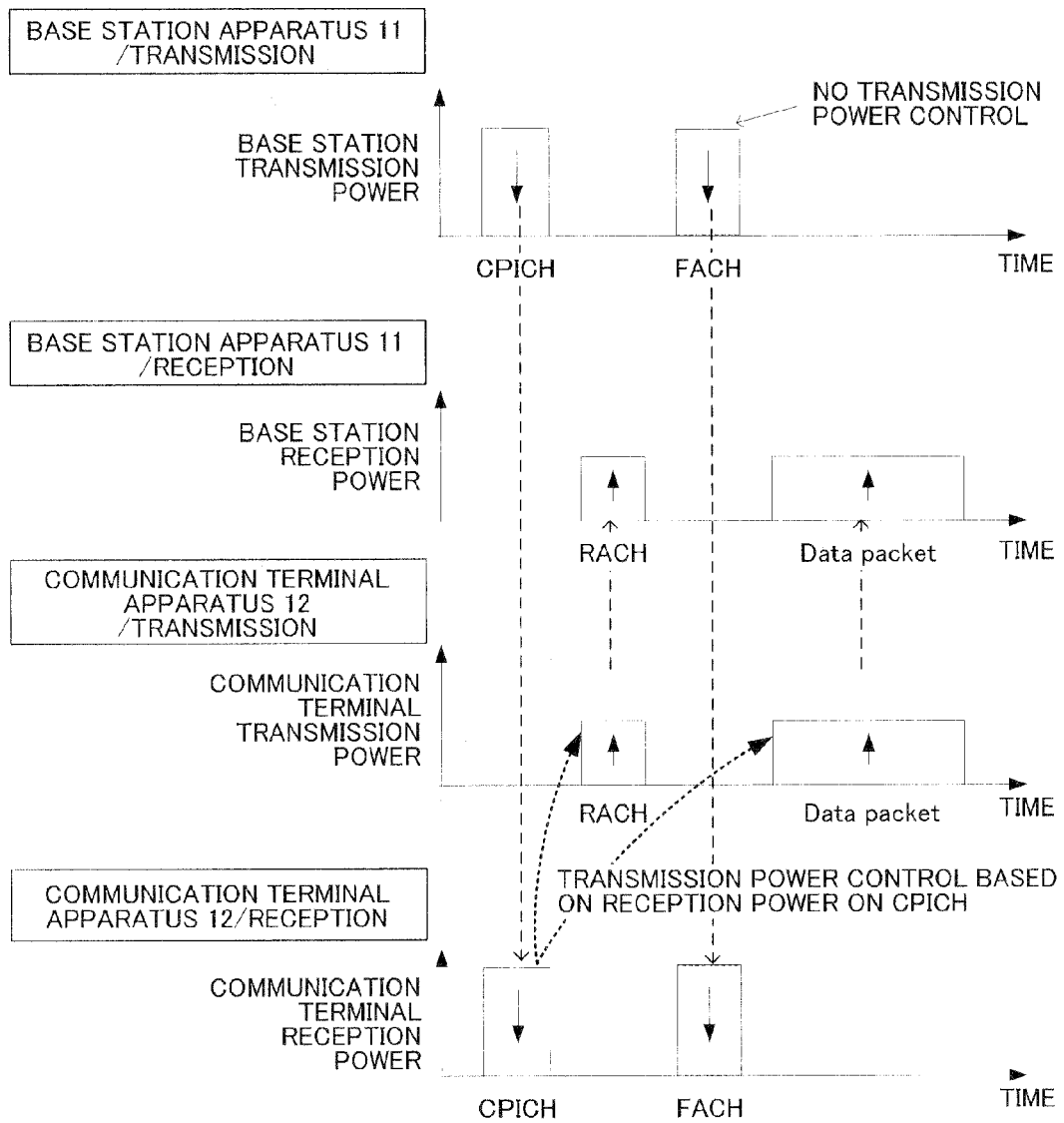
FIG. 2 is a diagram illustrating radio signals on the time series transmitted and received between a communication terminal apparatus and base station apparatus when the communication terminal apparatus starts communication according to the conventional technique.

Embodiments of the invention will now be described below in detail with reference to accompanying drawings as appropriate. In addition, in the embodiments, components with the same function are assigned the same reference numerals, and descriptions thereof will be omitted.

Embodiment 1

Figure 3:
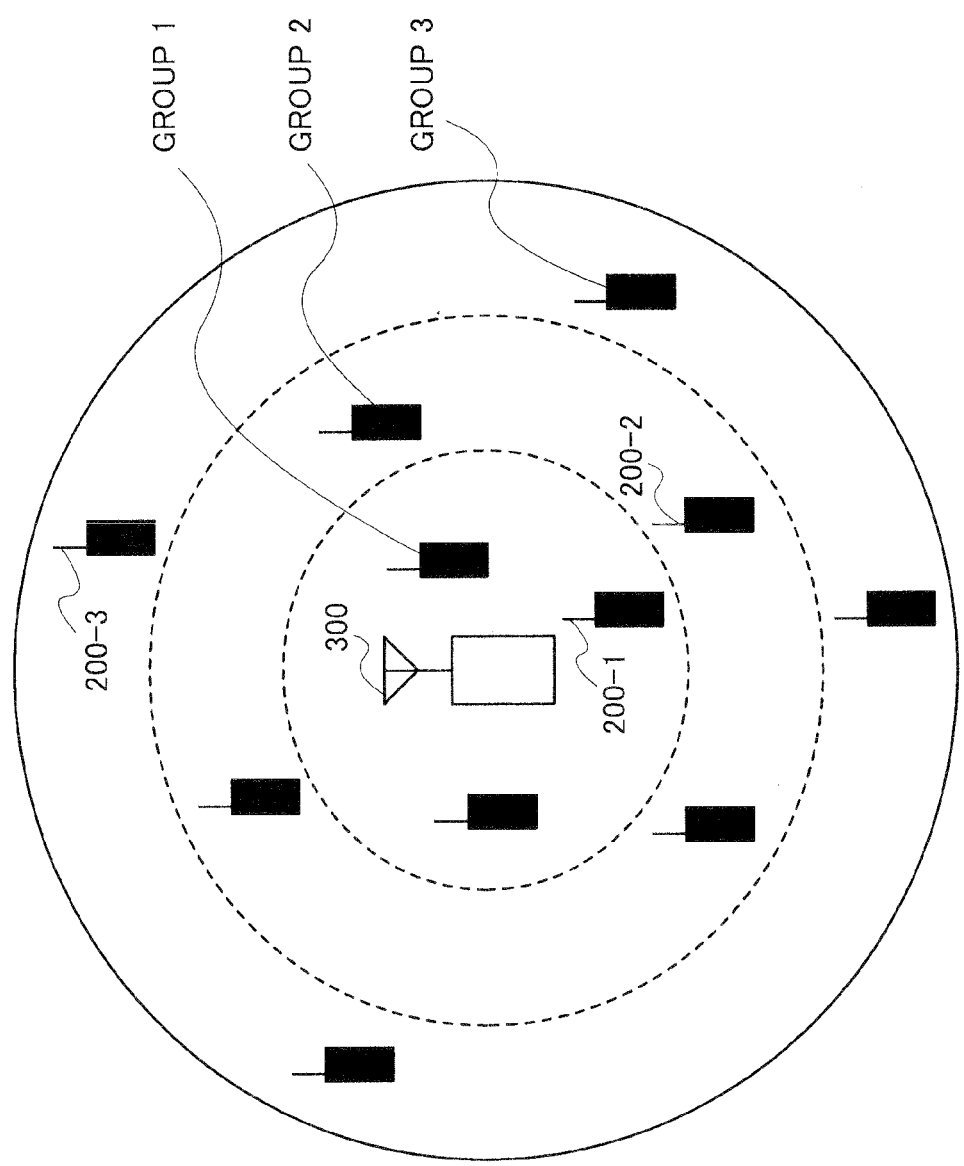
FIG. 3 is a diagram schematically illustrating a configuration of a radio communication system according to Embodiment 1 of the present invention.

FIG. 3 schematically illustrates a configuration of a radio communication system according to Embodiment 1 of the present invention. The radio communication system according to this embodiment is comprised of a plurality of communication terminal apparatuses 200 and base station apparatus 300. In the radio communication system, the plurality of communication terminal apparatuses 200 is classified into three groups based on reception quality of a pilot signal transmitted from base station apparatus 300 on CPICH, for example. Hereinafter, the groups are referred to as group 1, group 2 and group 3, in descending order of the reception quality. Further, communication terminal apparatuses belonging to group 1 are described as communication terminal apparatuses 200-1, communication terminal apparatuses belonging to group 2 are described as communication terminal apparatuses 200-2, and communication terminal apparatuses belonging to group 3 are described as communication terminal apparatuses 200-3. Accordingly, communication terminal apparatuses 200 existing near a cell edge belong to group 3 in the radio communication system.

Figure 4:
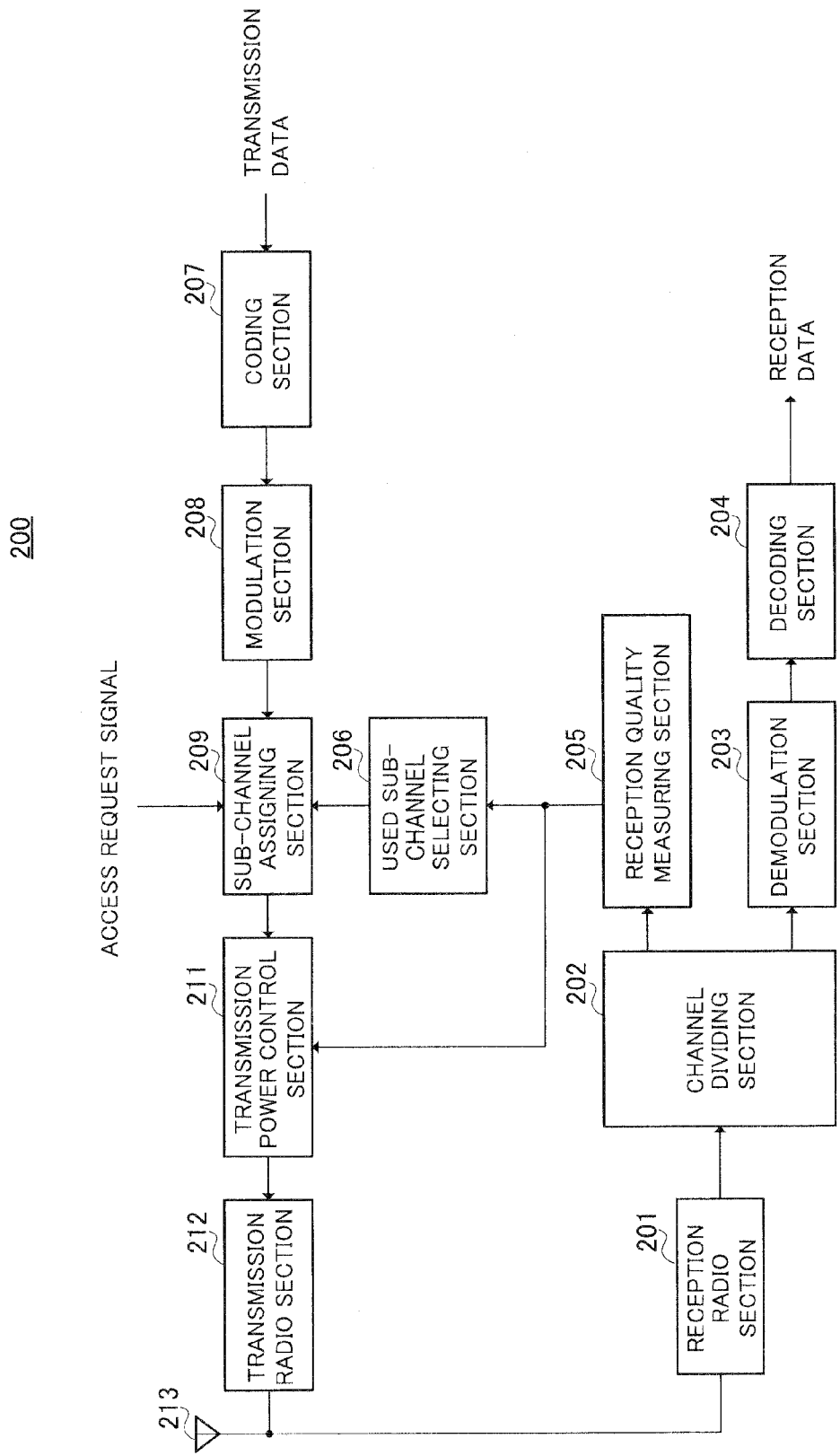
FIG. 4 is a block diagram illustrating a configuration of a communication terminal apparatus according to Embodiment 1 of the present invention.

FIG. 4 is a block diagram illustrating a configuration of communication terminal apparatus 200 according to Embodiment 1 of the invention. Communication terminal apparatus 200 has reception radio section 201, channel dividing section 202, demodulation section 203, decoding section 204, reception quality measuring section 205, used sub-channel selecting section 206, coding section 207, modulation section 208, sub-channel assigning section 209, transmission power control section 211, transmission radio section 212 and antenna element 213.

Reception radio section 201 receives a pilot signal transmitted on CPICH via antenna element 213, access permission signal transmitted on FACH and the like from base station apparatus 300 described later, performs predetermined reception processing such as frequency conversion, analog/digital conversion and the like on the received signals, and inputs the received signals subjected to the reception processing to channel dividing section 202.

Channel dividing section 202 determines a channel used in the received signals input from reception radio section 201, and when the determined channel is the CPICH, inputs the received signal, namely pilot signal to reception quality measuring section 205. Meanwhile, when the determined channel is other than the CPICH namely FACH and the like, channel dividing section 202 inputs the received signal to demodulation section 203.

Demodulation section 203 demodulates the received signal input from channel dividing section 202 with a predetermined scheme, and inputs the demodulated received signal to decoding section 204.

Decoding section 204 decodes the received signal input from demodulation section 203 with a predetermined scheme to generate reception data, and inputs the generated reception data to a control section and the like not shown.

Reception quality measuring section 205 measures reception quality of the pilot signal input from channel dividing section 202, for example, Signal-to-Interference power Ratio (SIR), or a reception power level, and reports the measurement result to used sub-channel selecting section 206 and transmission power control section 211.

Used sub-channel selecting section 206 has a "correspondence table" between classified reception quality of the pilot signal and sub-channel assigned to each class. Then, based on the correspondence table, used sub-channel selecting section 206 selects a sub-channel group of the RACH associated with the measurement result of the reception quality of the pilot signal reported from reception quality measuring section 205, and randomly selects a single sub-channel for use in transmission of an access request signal from among the selected sub-channel group. Used sub-channel selecting section 206 reports the selected sub-channel to sub-channel assigning section 209. In addition, the correspondence table will be described later where the classified reception quality of the pilot signal and sub-channel of the RACH assigned to each class are indicated.

Coding section 207 codes transmission data input from the control section and the like not shown with a predetermined scheme to generate a transmission signal, and inputs the generated transmission signal to modulation section 208.

Modulation section 208 modulates the transmission signal input from coding section 207 with a predetermined scheme, and inputs the modulated transmission signal to sub-channel assigning section 209.

In starting radio communication, sub-channel assigning section 209 assigns a predetermined resource to an access request signal input from the control section and the like not shown so as to transmit the access request signal on the sub-channel of the RACH reported from used sub-channel selecting section 206. Examples of the predetermined resource include timing, channelization codes, subcarriers in a multicarrier signal and the like. Then, sub-channel assigning section 209 inputs the access request signal assigned the predetermined resource to transmission power control section 211 at predetermined timing. Further, when an access permission signal is not transmitted from base station apparatus 300 within a predetermined time after inputting the access request signal to transmission power control section 211, sub-channel assigning section 209 assigns again the sub-channel of the RACH reported from used sub-channel selecting section 206 to the access request signal after a lapse of predetermined back-off time, and inputs the assigned access request signal to transmission power control section 211. Meanwhile, when an access permission signal is transmitted from base station apparatus 300 within a predetermined time after inputting the access request signal to transmission power control section 211, sub-channel assigning section 209 assigns a predetermined resource to the transmission signal input from modulation section 208 so as to transmit the transmission signal on a data channel designated by the access permission signal, and inputs the transmission signal to transmission power control section 211 at predetermined timing.

Transmission power control section 211 amplifies the access request signal or transmission signal input from sub-channel assigning section 209 to provide power associated with the measurement result of the reception quality of the pilot signal reported from reception quality measuring section 205, and inputs the amplified access request signal or transmission signal to transmission radio section 212.

Transmission radio section 212 performs predetermined transmission processing such as digital/analog conversion, frequency conversion and the like on the access request signal or transmission signal input from transmission power control section 211, and wirelessly transmits the signal to base station apparatus 300 via antenna element 213.

Figure 5:
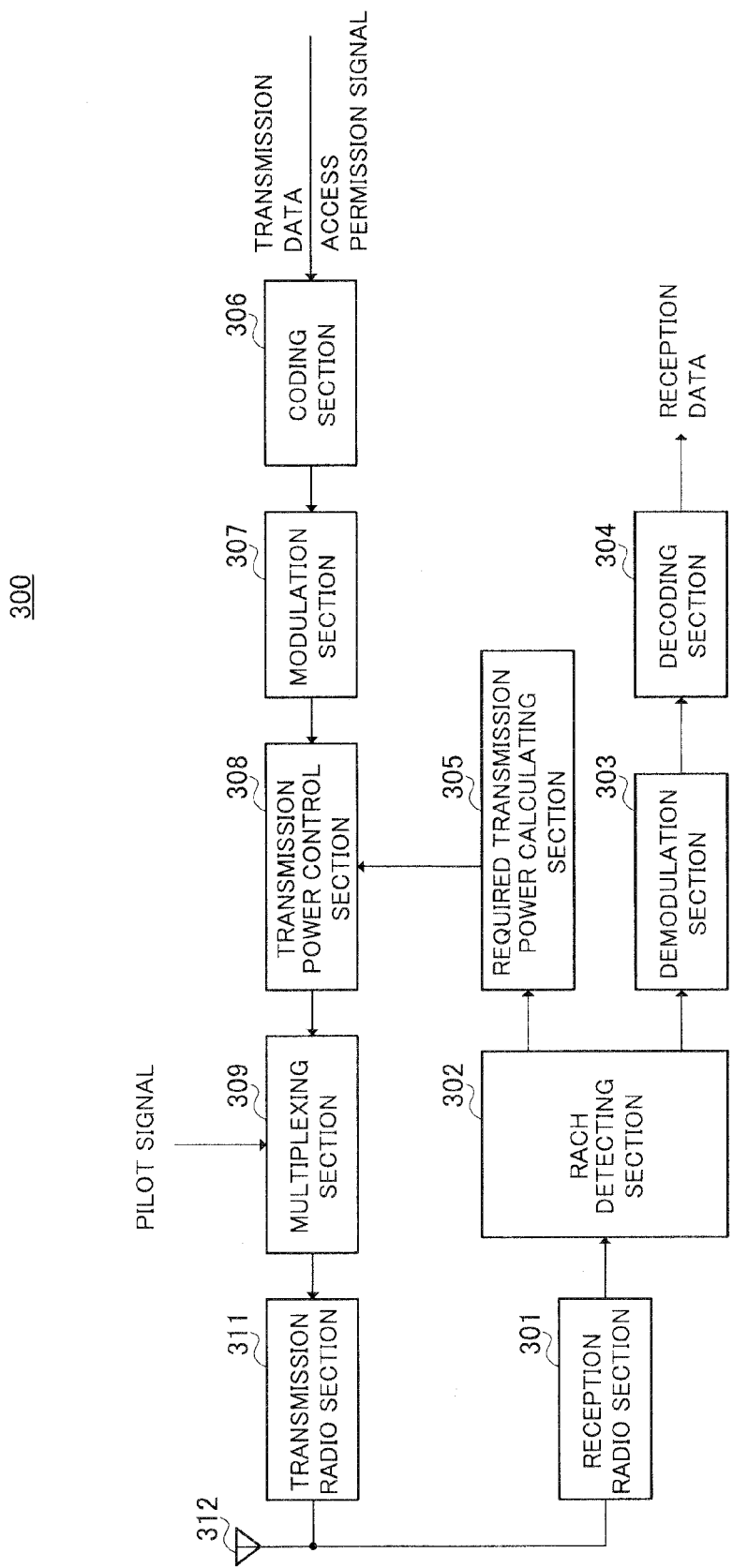
FIG. 5 is a block diagram illustrating a configuration of a base station apparatus according to Embodiment 1 of the present invention.

FIG. 5 is a block diagram illustrating a configuration of base station apparatus 300 according to Embodiment 1 of the invention. Base station apparatus 300 has reception radio section 301, RACH detecting section 302, demodulation section 303, decoding section 304, required transmission power calculating section 305, coding section 306, modulation section 307, transmission power control section 308, multiplexing section 309, transmission radio section 311 and antenna element 312.

Reception radio section 301 receives the access request signal transmitted on the RACH and transmission signal transmitted on the data channel from communication terminal apparatus 200 via antenna element 312, performs predetermined reception processing such as frequency conversion, analog/digital conversion and the like on the received signals, and inputs the received signals subjected to the reception processing to RACH detecting section 302.

RACH detecting section 302 detects the access request signal from the received signals input from reception radio section 301, and when the access request signal is detected, inputs the access request signal to required transmission power calculating section 305. Meanwhile, when the access request signal is not detected, RACH detecting section 302 determines that the received signals include only normal data signals, and inputs the received signals to demodulation section 303.

Demodulation section 303 performs demodulation processing on the received signal input from RACH detecting section 302 with a predetermined scheme, and inputs the demodulated received signal to decoding section 304.

Decoding section 304 decodes the received signal input from demodulation section 303 with a predetermined scheme to generate reception data, and inputs the generated reception data to a control section and the like not shown.

Required transmission power calculating section 305 determines the sub-channel of the RACH used in transmission of the access request signal input from RACH detecting section 302. Required transmission power calculating section 305 has the correspondence table that used sub-channel selecting section 206 has, and based on the correspondence table, required transmission power calculating section 305 recognizes the reception quality of the pilot signal in communication terminal apparatus 200 from the determined RACH sub-channel. Further, required transmission power calculating section 305 also has a "conversion table" that associates the determined sub-channel with transmission power of the access permission signal, calculates the transmission power associated with the determined RACH sub-channel using the conversion table, and reports the calculated transmission power to transmission power control section 308. In addition, the conversion table will be described later.

Coding section 306 performs coding processing on the access permission signal or transmission data input from the control section and the like not shown with a predetermined scheme to generate a transmission signal, and inputs the generated transmission signal to modulation section 307.

Modulation section 307 modulates the transmission signal input from coding section 306 with a predetermined scheme, and inputs the modulated transmission signal to transmission power control section 308.

Transmission power control section 308 amplifies the transmission signal input from modulation section 307 to provide power reported from required transmission power calculating section 305, and inputs the amplified transmission signal to multiplexing section 309.

Multiplexing section 309 receives a pilot signal from the control section and the like not shown periodically, multiplexes the pilot signal on the transmission signal input from transmission power control section 308 at timing at which the pilot signal is input, and inputs the multiplexed transmission signal to transmission radio section 311. In addition, multiplexing section 309 causes the transmission signal input from transmission power control section 308 to pass through transmission radio section 311 without change at timing at which the pilot signal is not input.

Transmission radio section 311 performs transmission processing such as digital/analog conversion, frequency conversion and the like on the transmission signal input from multiplexing section 309, and wirelessly transmits the transmission signal subjected to the transmission processing to communication terminal apparatus 200 via antenna element 312.

The operation of communication terminal apparatus 200 and base station apparatus 300 will be described below in detail with reference to FIG. 6 to FIG. 13.

Figure 6:
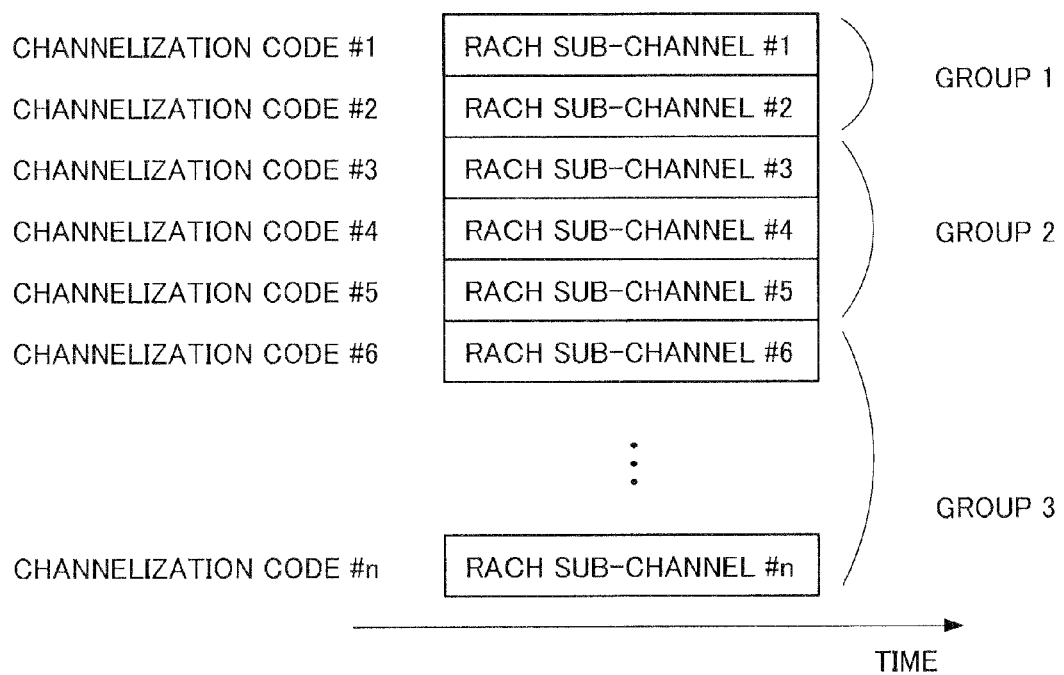
FIG. 6 is a diagram illustrating an example of an assignment mode of sub-channels of RACH to each group divided by reception quality of a pilot signal when channelization codes are used as the sub-channels of the RACH in Embodiment 1 of the present invention.

FIG. 6 shows an assignment mode of channelization codes to group 1, group 2 and group 3 classified based on the reception quality of the pilot signal when communication terminal apparatus 200 uses the channelization code as a resource of the sub-channel of the RACH. In FIG. 6, two channelization codes #1 and #2 are assigned to group 1 with the highest reception quality of the pilot signal, three channelization codes #3, #4 and #5 are assigned to group 2 with the middle reception quality, and all of remaining usable channelization codes #6 to #n (n is a natural number of ten or more), are assigned to group 3 with the lowest reception quality.

Figure 7:
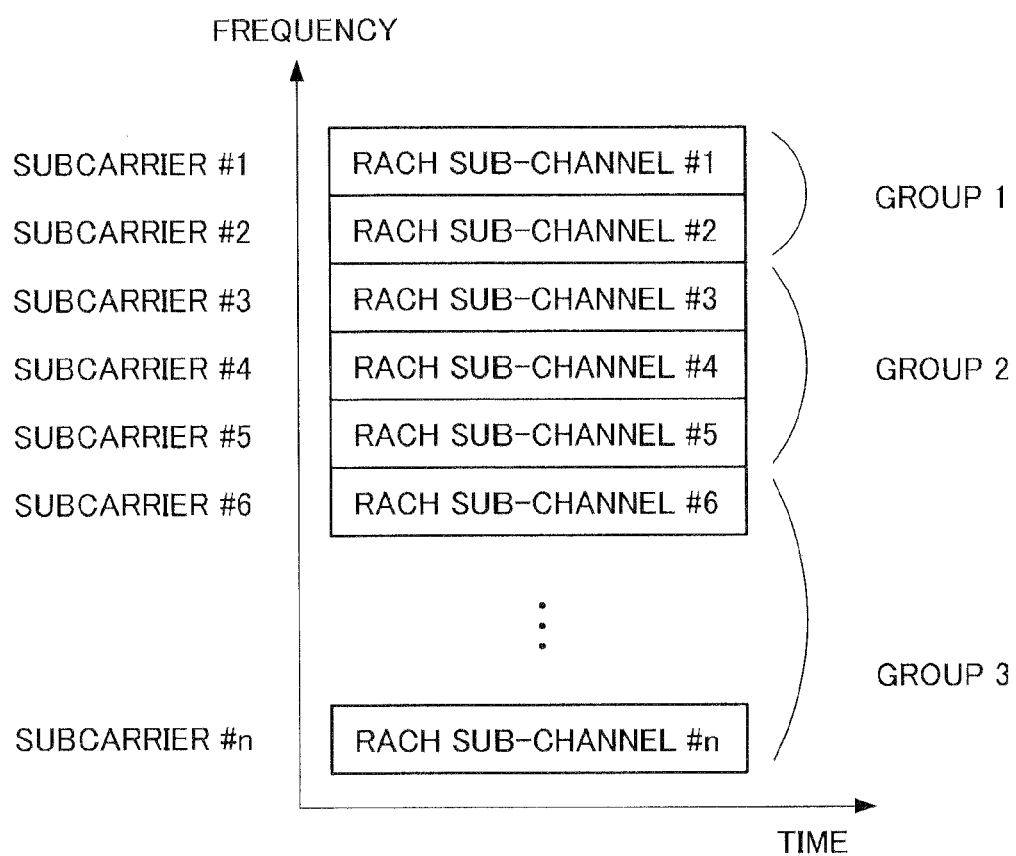
FIG. 7 is a diagram illustrating another example of the assignment mode of sub-channels of RACH to each group divided by reception quality of the pilot signal when subcarriers in a multicarrier signal are used as the sub-channels of the RACH in Embodiment 1 of the present invention.

Further, FIG. 7 shows an assignment mode of subcarriers to group 1, group 2 and group 3 classified based on the reception quality of the pilot signal when communication terminal apparatus 200 uses the subcarriers in a multicarrier signal as a resource of the sub-channel of the RACH. In FIG. 7, two subcarriers #1 and #2 are assigned to group 1 with the highest reception quality of the pilot signal, three subcarriers #3, #4 and #5 are assigned to group 2 with the middle reception quality, and all of remaining usable subcarriers #6 to #n (n is a natural number of ten or more) are assigned to group 3 with the lowest reception quality.

Figure 8:
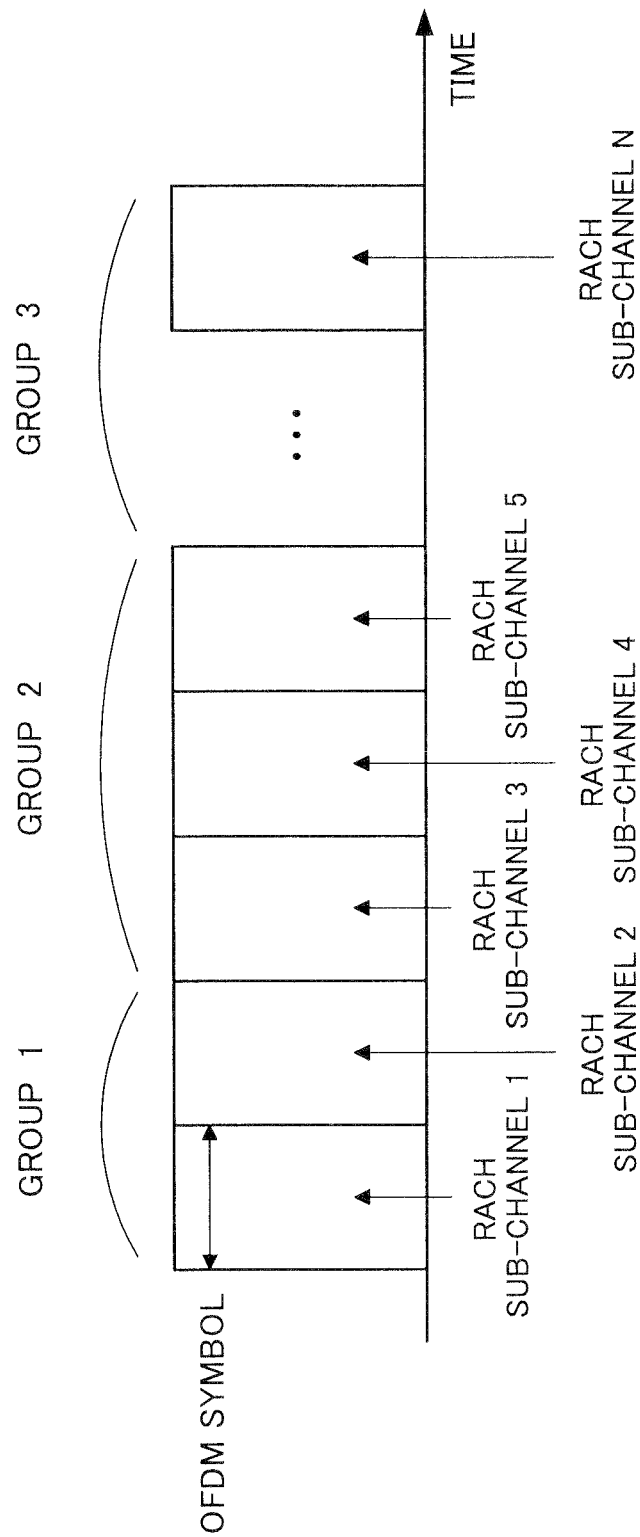
FIG. 8 is a diagram illustrating still another example of the assignment mode of sub-channels of RACH to each group divided by reception quality of the pilot signal when symbols of an OFDM signal are used as the sub-channels of the RACH in Embodiment 1 of the present invention.

Furthermore, FIG. 8 shows an assignment mode of symbols of an OFDM (Orthogonal Frequency Division Multiplexing) signal to group 1, group 2 and group 3 classified based on the reception quality of the pilot signal when communication terminal apparatus 200 uses the symbols in an OFDM signal as a resource of the sub-channel of the RACH. In FIG. 8, first two symbols of an OFDM signal are assigned to group 1 with the highest reception quality of the pilot signal, subsequent three symbols of the OFDM signal are assigned to group 2 with the middle reception quality, and all of remaining usable symbols of the OFDM signal are assigned to group 3 with the lowest reception quality. In addition, also when the resource of the sub-channel of the RACH is a time slot standardized in a communication scheme, the time slot can be assigned as in the symbol of an OFDM signal.

FIG. 9 shows an example of the correspondence table provided in used sub-channel selecting section 206. In the correspondence table, group 1 is of the case that the measurement result of reception SIR is 15 dB or more as the reception quality of the pilot signal by reception quality measuring section 205, group 2 is of the case that the measurement result is 5 to 15 dB, and group 3 is of the case that the measurement result is −3 to 5 dB. Group 1, group 2 and group 3 as shown in FIG. 9 are respectively assigned sub-channels in modes as shown in FIG. 6 to FIG. 8. Accordingly, based on the correspondence table, used sub-channel selecting section 206 selects sub-channels of the RACH assigned in the modes as shown in FIGS. 6 to 8 corresponding to the measurement result of the reception quality of the pilot signal reported from reception quality measuring section 205, and randomly selects one sub-channel to be used in transmitting the access request signal from among the selected plurality of sub-channels. In addition, any groups are not associated with the case that the measurement result is less than −3 dB in the reception quality of the pilot signal by reception quality measuring section 205. This is because when the measurement result of the reception quality of the pilot signal is less than −3 dB, the propagation path condition is excessively poor, and the risk is thereby high that base station apparatus 300 does not receive an access request signal even when communication terminal apparatus 200 transmits the access request signal. Therefore, in order to prevent the occurrence of an interfering signal in adjacent other cells, communication terminal apparatus 200 is prevented from transmitting an unnecessary access request signal. In addition, in this case, when communication terminal apparatus 200 recovers from the attenuation due to fading, shadowing or the like on the propagation path and has the measurement result of −3 dB or more in the reception quality of the pilot signal, communication terminal apparatus 200 can access base station apparatus 300.

FIG. 10 shows an example of the conversion table that required transmission power calculating section 305 has. The conversion table has a correlation with the correspondence table as shown in FIG. 9. On the assumption that the required reception SIR is 0 dB for the access permission signal in communication terminal apparatus 200, the transmission power of the access permission signal in base station apparatus 300 is expressed by decibel based on the transmission power of the pilot signal. More specifically, for group 1, since the measurement result is 15 dB or more in the reception quality of the pilot signal in communication terminal 200-1, in order that the reception quality is 0 dB or more in the access permission signal in communication terminal apparatus 200-1, the transmission power of the access permission signal in base station apparatus 300 is set at −15 dB based on the transmission power of the pilot signal. Similarly, for group 2, since the measurement result is 5 dB or more in the reception quality of the pilot signal in communication terminal 200-2, the transmission power of the access permission signal in base station apparatus 300 is set at −5 dB based on the transmission power of the pilot signal. Further, for group 3, since the measurement result is −3 dB or more in the reception quality of the pilot signal in communication terminal 200-3, the transmission power of the access permission signal in base station apparatus 300 is set at 3 dB based on the transmission power of the pilot signal.

Figure 11:
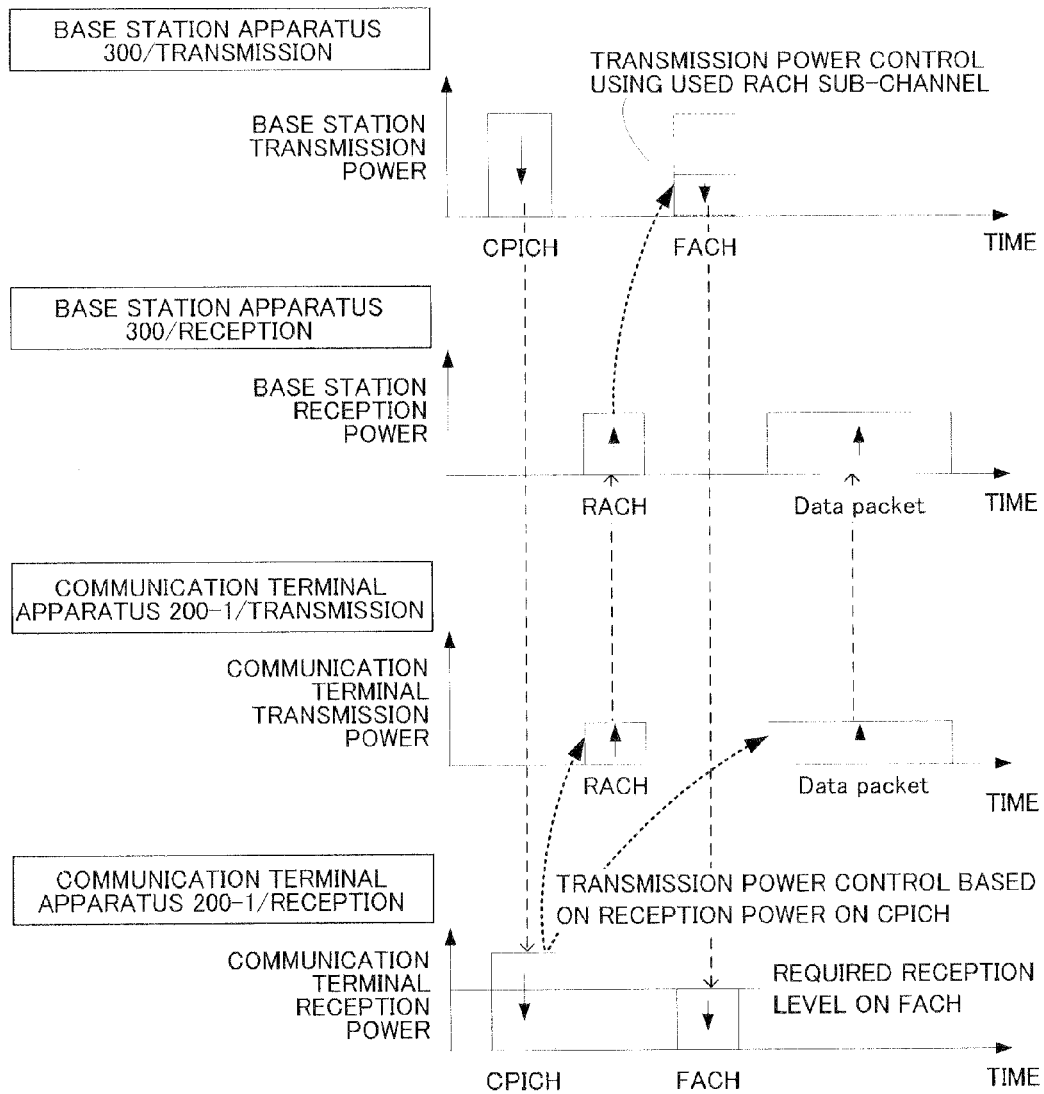
FIG. 11 is a diagram illustrating radio signals on the time series transmitted and received between the communication terminal apparatus and base station apparatus when the communication terminal apparatus starts communication in Embodiment 1 of the present invention.
Figure 12:
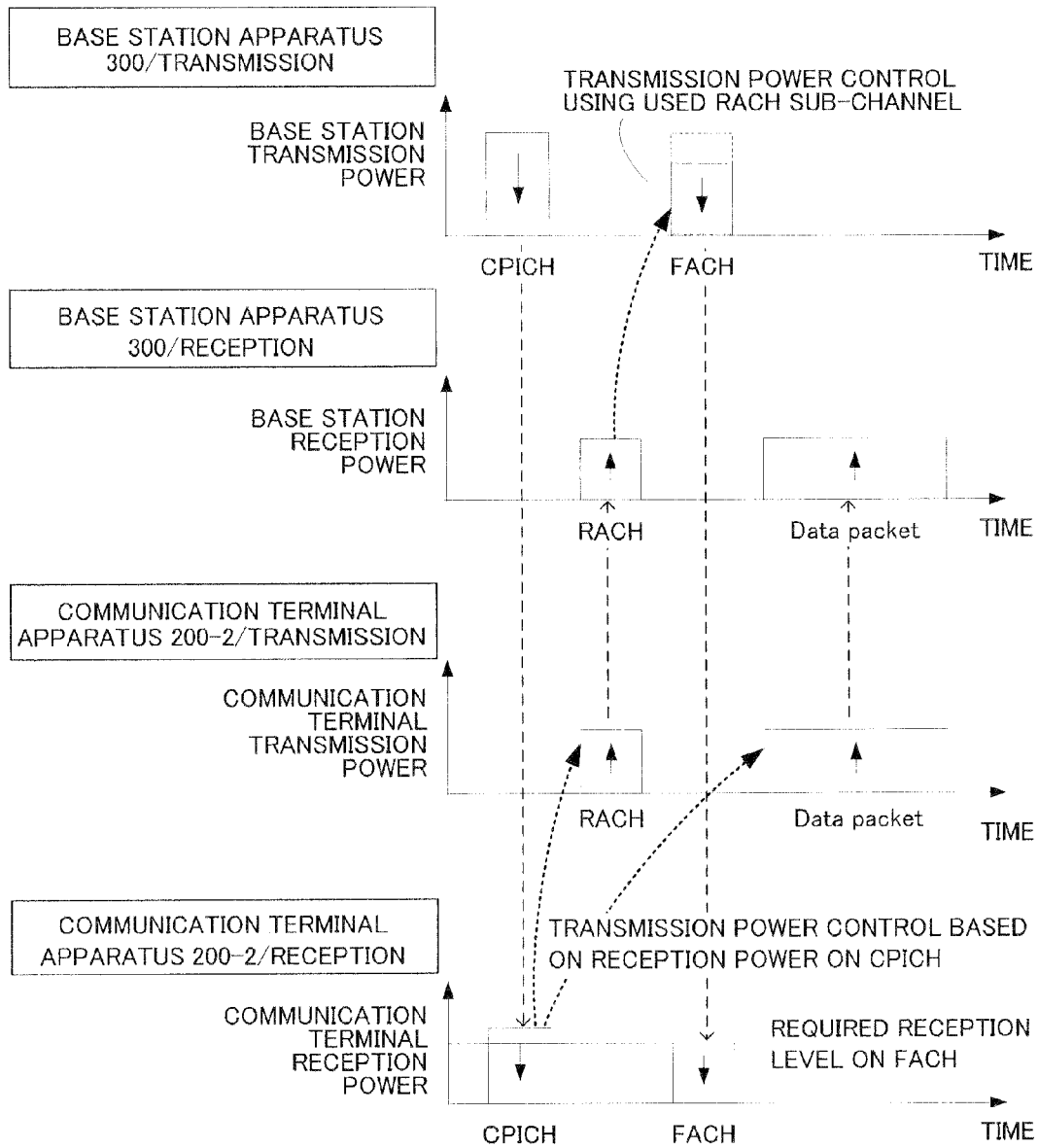
FIG. 12 is another diagram illustrating radio signals on the time series transmitted and received between the communication terminal apparatus and base station apparatus when the communication terminal apparatus starts communication in Embodiment 1 of the present invention.
Figure 13:
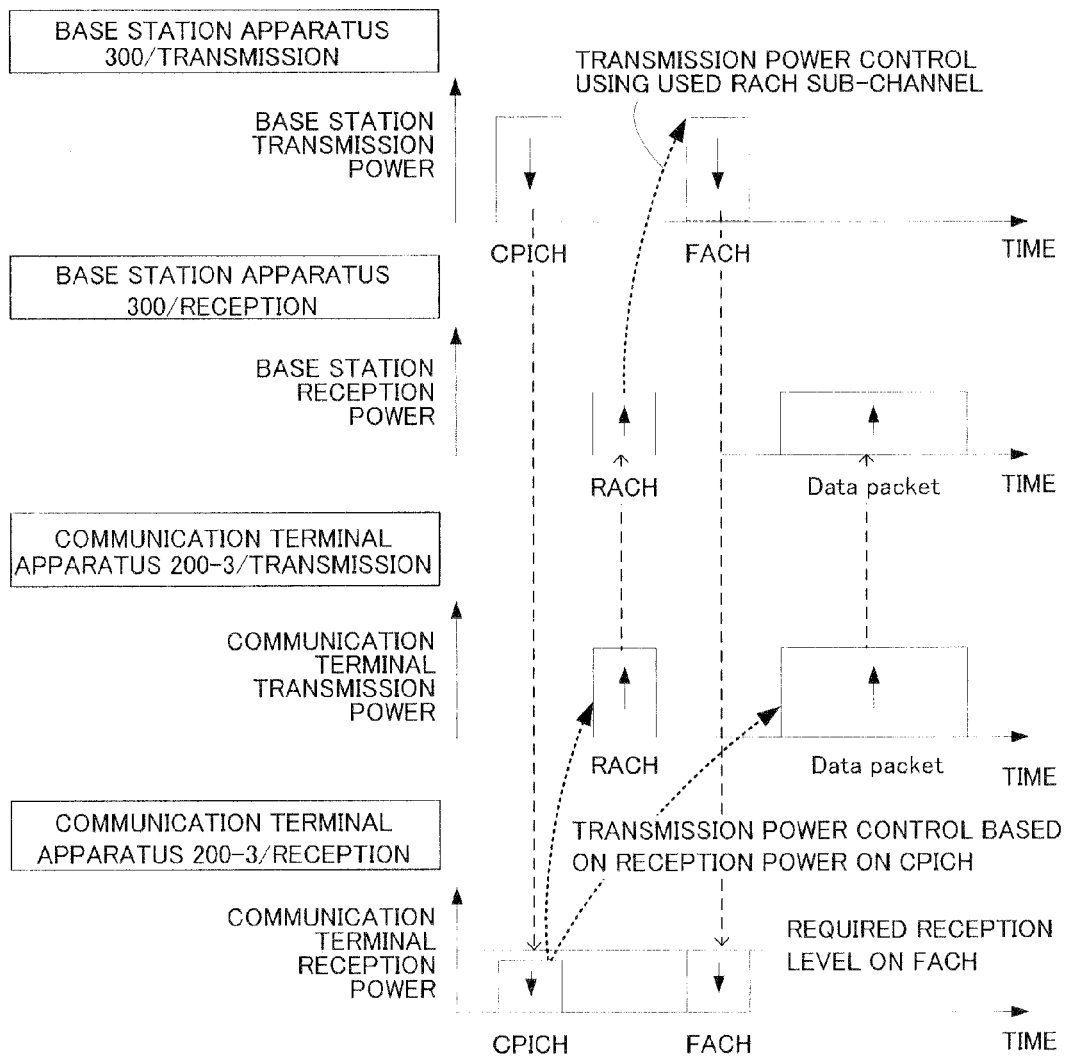
FIG. 13 is still another diagram illustrating radio signals on the time series transmitted and received between the communication terminal apparatus and base station apparatus when the communication terminal apparatus starts communication in Embodiment 1 of the present invention.

FIG. 11 illustrates radio signals on the time series transmitted and received between communication terminal apparatus 200-1 belonging to group 1 and base station apparatus 300 when communication terminal apparatus 200-1 starts communication. Similarly, FIG. 12 illustrates radio signals on the time series transmitted and received between communication terminal apparatus 200-2 belonging to group 2 and base station apparatus 300 when communication terminal apparatus 200-2 starts communication. Further, FIG. 13 illustrates radio signals on the time series transmitted and received between communication terminal apparatus 200-3 belonging to group and base station apparatus 300 when communication terminal apparatus 200-3 starts communication. In addition, in FIG. 11 to FIG. 13, a reception power level of a pilot signal is used as the reception quality of the pilot signal. As shown in FIG. 11 to FIG. 13, based on the measurement result of the reception quality of the pilot signal, communication terminal apparatuses 200-1 to 200-3 perform transmission power control on the access request signal transmitted on the RACH and a data packet transmitted on the data channel. Meanwhile, base station apparatus 300 determines the sub-channel of the RACH used by communication terminal apparatus 200, indirectly recognizes the measurement result of the reception quality of the pilot signal in communication terminal apparatus 200, namely recognizes that communication terminal apparatus 200 belongs to which group among groups 1 to 3, and performs transmission power control on the access permission signal transmitted on the FACH. Accordingly, by comparing between FIG. 11 and FIG. 13, it is understood that the transmission power on the FACH to transmit the access permission signal is different from one another, and that the transmission power on the FACH is the highest in FIG. 13 showing communication terminal apparatus 200-3 with the lowest reception quality of the pilot signal.

Thus, according to the radio communication system according to this Embodiment, communication terminal apparatus 200 classifies measurement results of the reception quality of the pilot signal, assigns dedicated RACH sub-channels to each class beforehand, and selects an RACH sub-channel to use in transmitting an access request signal according to an actual measurement result, so that it is possible to decrease the probability that a plurality of communication terminal apparatuses 200 concurrently uses the same RACH sub-channel. As a result, according to the radio communication system according to this embodiment, the access request signal is received reliably in base station apparatus 300, the number of retransmissions of the access request signal decreases, so that it is possible for communication terminal apparatus 200 to start radio communication in a short period, improve throughput in the cell, and prevent the occurrence of an interfering signal in other cells adjacent to the cell.

Further, according to the radio communication system according to this embodiment, base station apparatus 300 transmits the access permission signal with required sufficient transmission power according to the reception quality of the access request signal in each of communication terminal apparatuses 200-1 to 200-3, so that it is possible to prevent the access permission signal from being an interfering signal in other cells adjacent to the cell of base station apparatus 300.

Furthermore, according to the radio communication system according to this embodiment, in the correspondence table provided in used sub-channel selecting section 206 in communication terminal apparatus 200, a larger number of sub-channels are assigned to a lower class (for example, group 3) than a higher class (for example, group 1) in classified reception quality of the pilot signal. By this means, communication terminal apparatuses 200 positioned nearer the cell edge decrease the probability of concurrently using the same RACH sub-channel, and the number of retransmissions of the access request signal decreases that it is possible to efficiently prevent the occurrence of the interfering signal in other cells adjacent to the cell of communication terminal apparatuses 200.

Moreover, in the radio communication system according to this embodiment, in the correspondence table provided in used sub-channel selecting section 206 at communication terminal apparatus 200, with respect to the classified reception quality of the pilot signal, a range of the reception quality in a lower class is narrower than that in a higher class. More specifically, the range of the reception quality of group 1 is 15 dB or more without an upper limit, the range of the reception quality of group 2 is 10 dB of between 5 and 15 dB, and the range of the reception quality of group 3 is 8 dB of between −3 and 5 dB. Therefore, according to the radio communication system according to this embodiment, since a larger number of sub-channels are assigned to a lower class with a narrower range of the reception quality of the pilot signal, it is possible to further reduce efficiently the number of retransmissions of the access request signal of communication terminal apparatus 200 positioned near the cell edge, so that it is possible to prevent the occurrence of the interfering signal in other cells adjacent to the cell of communication terminal apparatus 200 more effectively.

In addition, this embodiment may be modified and applied as described below.

In base station apparatus 300 according to this embodiment, the case has been described where required transmission power calculating section 305 determines a sub-channel of the RACH used in transmission of the access request signal, and reports transmission power control section 308 of transmission power associated with the determined sub-channel, but the invention is not limited to this case. For example, required transmission power calculating section 305 may have a request signal measuring section that measures reception quality of an access request signal, compare the reception quality measured in the request signal measuring section with required reception quality in communication terminal apparatus 200, namely target reception quality in transmission power control, increase or decrease the transmission power associated with the sub-channel of the RACH when a difference of the reception quality is larger than a predetermined value, and report the increased or decreased transmission power to transmission power control section 308.

Calculation of the transmission power of the access permission signal in required transmission power calculating section 305 is calculation by closed-loop based on the reception quality of the access request signal. Therefore, when the time is required at communication terminal apparatus 200 from the reception of a pilot signal until the transmission of an access request signal or when the variation is intense in propagation path conditions, there is a risk that actual propagation path conditions are not reflected in the calculated transmission power. Then, if required transmission power calculating section 305 performs calculation of the transmission power by open-loop for measuring the reception quality of the access request signal, in addition to calculation of the transmission power by closed-loop, it is possible to perform transmission power control of the access permission signal more accurately.

Embodiment 2

Embodiment 2 of the invention describes the case where a base station apparatus varies adaptively a coding rate and modulation scheme on the FACH based on used resources of the RACH. In addition, a configuration of a communication terminal apparatus according to this embodiment is the same as that in FIG. 4, and described using FIG. 4.

Figure 14:
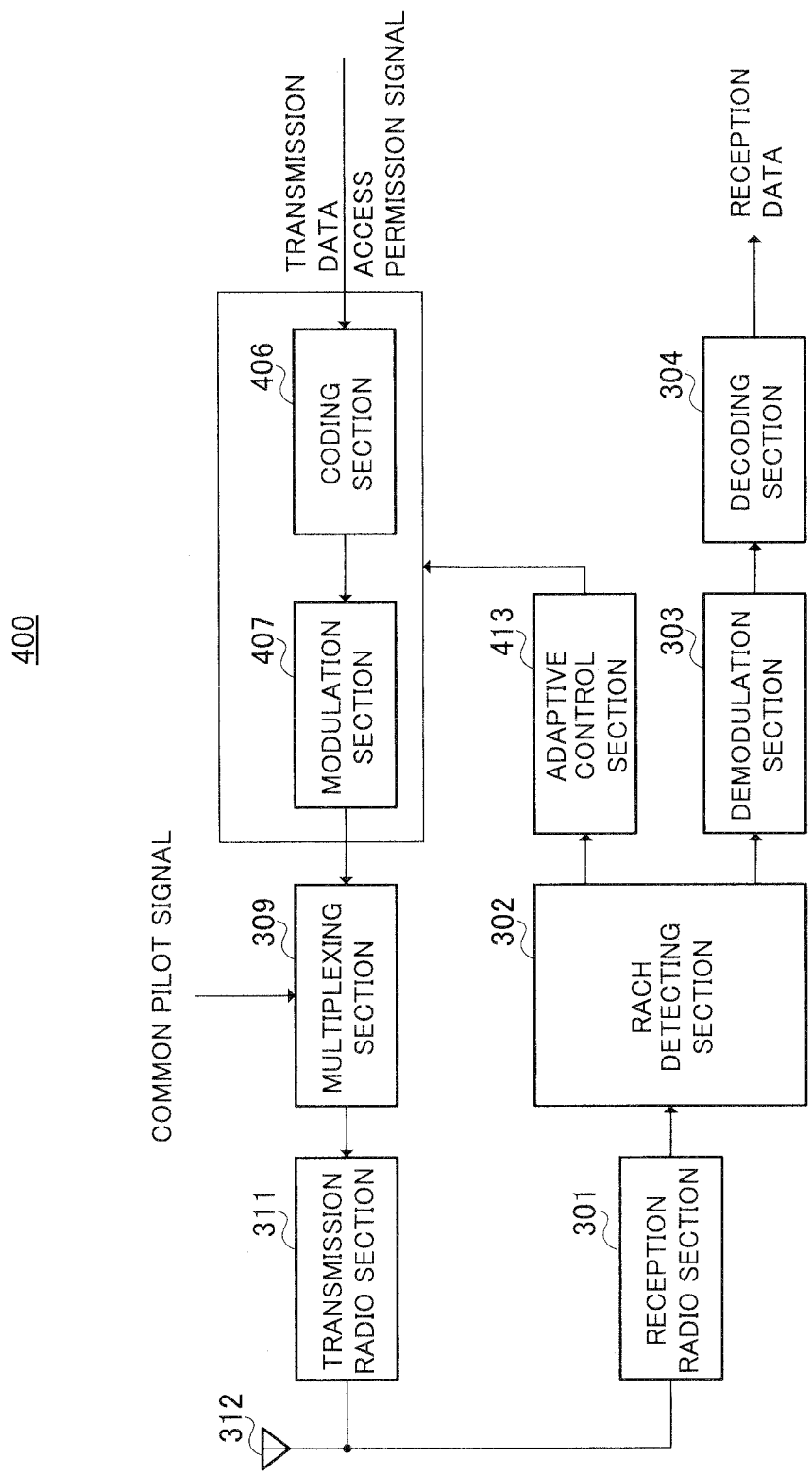
FIG. 14 is a block diagram illustrating a configuration of a base station apparatus according to Embodiment 2 of the present invention.

FIG. 14 is a block diagram illustrating a configuration of base station apparatus 400 according to Embodiment 2 of the invention. Base station apparatus 400 has reception radio section 301, RACH detecting section 302, demodulation section 303, decoding section 304, adaptive control section 413, coding section 406, modulation section 407, multiplexing section 309, transmission radio section 311 and antenna element 312.

Adaptive control section 413 determines a sub-channel of the RACH used in transmission of an access request signal input from RACH detecting section 302, sets a modulation scheme and coding rate using a conversion table that associates the determined sub-channel with a transmission parameter, namely a set of the modulation scheme and coding rate of an access permission signal, and inputs the set modulation scheme and coding rate to coding section 406 and modulation section 407.

Coding section 406 performs coding processing on the access permission signal or transmission data input from the control section and the like not shown with the coding rate or coding method according to the transmission parameter (information of the coding rate and modulation scheme) input from adaptive control section 413 to generate a transmission signal, and inputs the generated transmission signal to modulation section 407.

Modulation section 407 modulates the transmission signal input from coding section 406 with the modulation scheme according to the transmission parameter input from adaptive control section 413, and inputs the modulated transmission signal to multiplexing section 309.

FIG. 15 shows an example of the conversion table that adaptive control section 413 has. The conversion table has a correlation with the correspondence table as shown in FIG. 9, and as the reception quality in communication terminal apparatus 200 is higher, the modulation level and coding rate increase. For example, in group 1, since the reception quality is 15 dB or more, the transmission parameter such that the required SIR is 15 dB, namely 16QAM and R=¾ is used that is the transmission parameter with the highest transmission efficiency enabling reception with a sufficiently low error rate when the reception SIR is 15 dB or more. In group 2, since the reception SIR is 5 dB to 15 dB, QPSK and R=½ is used that is the transmission parameter such that the reception SIR is 5 dB. The same also applies to group 3.

As the transmission parameter has higher transmission efficiency, it is possible for base station apparatus 400 to finish transmission of the access permission signal in a shorter time.

Thus, according to this embodiment, base station apparatus 400 transmits an access permission signal using a transmission parameter with the highest transmission efficiency that allows reception with a sufficiently low error rate according to the reception quality of the access request signal in each of communication terminal apparatuses 200-1 to 200-3, so that it is possible to reduce the transmission time of the access permission signal, and prevent the access permission signal from being an interfering signal in other cells.

Each of the above-mentioned Embodiments has described the case where the invention is constructed by hardware as an example, but it is also possible to implement the present invention by software.

Each function block employed in the description of each of the aforementioned embodiments may typically be implemented as an LSI constituted by an integrated circuit. These may be individual chips or partially or totally contained on a single chip. "LSI" is assumed here but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and setting of circuit cells within an LSI can be reconfigured is also possible.

Furthermore, if integrated circuit technology comes out to replace LSI's as a result of the advancement of semiconductor technology or a derivative other technology, it is naturally also possible to carry out function block integration using this technology. Application in biotechnology is also possible.

In addition, in the radio communication system according to each of the above-mentioned embodiments, the case has been described where a plurality of communication terminal apparatuses 200 is divided into three groups in association with classes of the reception quality of the pilot signal, but the invention is not limited to this case. For example, the number of groups may be increased.

Further, the access permission signal may be transmitted, for example, in 3GPP standards, using AICH (Acknowledge Indicator Channel), FACH (Forward Access Channel), S-CCPCH (Secondary-Common Control Physical Channel), HS-SCCH (High Speed-Shared Control Channel), and DPCH (Dedicated Physical Channel).

Furthermore, in each of the above-mentioned embodiments, it is described that an access request is made on the RACH, access permission is made on the FACH, and then, data packets are transmitted. However, the same effects are obtained when the RACH is used in transmission of data as well as the access request signal, and the FACH is used in transmission of data as well as the access permission signal. For example, for a short packet, packet with demanding delay requirement and the like, the data packet on uplink may be transmitted on the RACH, while the data packet on downlink may be transmitted on the FACH.

Still furthermore, the RACH in each of the above-mentioned embodiments may be another comparable channel to which resource are not assigned beforehand for each user.

Moreover, in each of the above-mentioned embodiments, it is described that the reception quality is estimated from the reception SIR, but the reception quality may be estimated from reception SNR, reception CIR, reception SINR, reception CINR, reception power, interfering power, bit error rate, throughput, MCS (a combination of a modulation scheme and coding rate) capable of achieving a predetermined error rate, and the like. Further, the base station apparatus may be represented by Node B, and the communication terminal apparatus may be represented by UE.

A first aspect of the invention is a communication terminal apparatus which performs radio communication with a base station apparatus, and has a receiving section that receives a pilot signal transmitted from the base station apparatus, a measuring section that measures reception quality of the received pilot signal, a selecting section that selects a sub-channel to be used in transmitting a signal to the base station apparatus according to a measurement result of the reception quality of the pilot signal, and a transmitting section that transmits the signal to the base station apparatus using the selected sub-channel.

A second aspect of the invention is a communication terminal apparatus where in the above-mentioned invention, the transmitting section transmits the signal using a random access channel.

A third aspect of the invention is a communication terminal apparatus where in the above-mentioned invention, the transmitting section transmits an access request signal.

A fourth aspect of the invention is a communication terminal apparatus where the selecting section assigns a larger number of sub-channels to a lower class than a higher class in classified reception quality, and selects the sub-channel to be used in transmitting the signal to the base station apparatus from among sub-channels assigned to a class corresponding to the measurement result of the reception quality of the pilot signal.

A fifth aspect of the invention is a communication terminal apparatus where in the above-mentioned invention, the selecting section assigns sub-channels to each class by narrowing a range of the reception quality for a lower class than a higher class in the classified reception quality, and selects the sub-channel to be used in transmitting the signal to the base station apparatus from among the sub-channels assigned to the class corresponding to the measurement result of the reception quality of the pilot signal.

A sixth aspect of the invention is a base station apparatus which performs radio communication with a communication terminal apparatus, and has a receiving section that receives a signal transmitted from the communication terminal apparatus, a detecting section that detects a sub-channel used in transmitting the received signal, and a transmitting section that transmits the signal to the communication terminal apparatus with transmission power associated with the detected sub-channel, or a modulation scheme and coding rate associated with the detected sub-channel.

A seventh aspect of the invention is the base station apparatus where in the above-mentioned invention, the transmitting section transmits an access permission signal.

An eighth aspect of the invention is a base station apparatus where in the above-mentioned embodiment, a request signal measuring section is further provided that measures reception quality of the signal received by the receiving section, and the transmitting section increases or decreases transmission power associated with the sub-channel detected in the detecting section, according to a difference between the reception quality measured by the request signal measuring section and target reception quality in transmission power control, and transmits the signal with increased or decreased power to the communication terminal apparatus.

A ninth aspect of the invention is a base station apparatus where in the above-mentioned invention, the receiving section receives the signal transmitted using a random access channel.

A tenth aspect of the invention is a radio communication system comprised of a communication terminal apparatus and a base station apparatus, where the communication terminal apparatus has a terminal receiving section that receives a pilot signal transmitted from the base station apparatus, a measuring section that measures reception quality of the received pilot signal, a selecting section that selects a sub-channel to be used in transmitting a signal to the base station apparatus according to a measurement result of the reception quality of the pilot signal, and a terminal transmitting section that transmits the signal to the base station apparatus using the selected sub-channel, and the base station apparatus has a base station receiving section that receives the signal transmitted from the communication terminal apparatus, a detecting section that detects the sub-channel used in transmitting the received signal, and a base station transmitting section that transmits the signal to the communication terminal apparatus with transmission power associated with the detected sub-channel.

An eleventh aspect of the invention is a radio communication system where in the above-mentioned invention, the terminal transmitting section transmits an access request signal.

A twelfth aspect of the invention is a radio communication system where in the above-mentioned invention, the base station transmitting section transmits an access permission signal.

The present application is based on Japanese Patent Application No. 2004-173017, filed on Jun. 10, 2004, entire content of which is expressly incorporated by reference herein.

INDUSTRIAL APPLICABILITY

The communication terminal apparatus and base station apparatus according to the present invention have effects of decreasing the incidence of collision of access request signals in a cell of the apparatus, preventing the occurrence of an interfering signal in other cells adjacent to the cell, and improving throughput in the cell, and are useful in a radio communication system and the like.

The invention claimed is:

1. A terminal comprising:
a receiver structured to receive a pilot signal;
a processor structured to measure a reception power of the pilot signal and to select, based on the reception power, one code group among three code groups, into which codes are divided, the code groups being respectively associated with different ranges of reception powers; and
a transmitter structured to perform a transmission via a RACH using a code randomly selected from codes of the selected one code group,
wherein a number of codes included in a first code group associated with a first range of reception power is larger than a number of codes included in a second code group associated with a second range of reception power,
and the number of codes included in the second code group is larger than a number of codes included in a third code group associated with a third range of reception power, the first range of reception power is narrower than the second range of reception power, and the second range of reception power is narrower than the third range of reception power.

2. The terminal of claim 1 wherein a low a first reception power associated with the first group is lower than a second reception power associated with the second group, and the second reception power is lower than a third reception power associated with the third group.

3. A base station comprising:
a transmitter structured to transmit a pilot signal to a terminal;
a receiver structured to receive data, which is transmitted from the terminal using a code randomly selected by the terminal, the code being selected from codes of one code group that is selected, based on a reception power of the pilot signal, among three code groups, into which codes are divided, and the code groups being respectively associated with different ranges of reception powers,
wherein a number of codes included in a first code group associated with a first range of reception power is larger than a number of codes included in a second code group associated with a second range of reception power,
and the number of codes included in the second code group is larger than a number of codes included in a third code group associated with a third range of reception power, the first range of reception power is narrower than the second range of reception power, and the second range of reception power is narrower than the third range of reception power.

4. The base station of claim 3 wherein a first reception power associated with the first group is lower than a second reception power associated with the second group, and the second reception power is lower than a third reception power associated with the third group.

5. A method comprising:
transmitting a pilot signal to a terminal;
receiving data, which is transmitted from the terminal using a code randomly selected by the terminal, the code being selected from codes of one code group that is selected, based on a reception power of the pilot signal, among three code groups, into which codes are divided, and the code groups being respectively associated with different ranges of reception powers,
wherein a number of codes included in a first code group associated with a first range of reception power is larger than a number of codes included in a second code group associated with a second range of reception power,
and the number of codes included in the second code group is larger than a number of codes included in a third code group associated with a third range of reception power, the first range of reception power is narrower than the second range of reception power, and the second range of reception power is narrower than the third range of reception power.

6. The method of claim 5 wherein a first reception power associated with the first group is lower than a second reception power associated with the second group, and the second reception power is lower than a third reception power associated with the third group.

* * * * *